United States Patent Office 3,006,790
Patented Oct. 31, 1961

3,006,790
FLUX CONTAINING CARBOXYPOLY-METHYLENE
Charles W. Ewing, Centerville, Ohio, assignor to General Motors Corporation, Detroit, Mich., a corporation of Delaware
No Drawing. Filed Oct. 20, 1958, Ser. No. 768,031
2 Claims. (Cl. 148—23)

This invention is related in a general way to chemistry and more particularly to fluxes for hard soldering, brazing or welding, especially fluoro-borate fluxes, commonly of fluoride-borate mixtures chosen from two or more of the following ingredients:

Boric acid;
Borax and alkali of borates such as sodium or potassium borate or tetraborate;
Alkali silico fluorides such as sodium or potassium silico fluoride;
Alkali fluoride such as sodium or potassium fluoride;
Alkali acid fluorides such as sodium or potassium acid fluoride;

Such fluxes tend to crystallize and become grainy upon standing for a considerable period; and, therefore are said to have a short shelf life. When diluted with water sufficiently for application to the part to be soldered, brazed or welded by spraying or dipping, the solids tend to settle out. Some materials such as sodium alginate and monoethanolamine have been proposed as preventatives of crystallization, graininess and settling out. However, they are objectionable from the standpoint that the alginate is organic and spoils in a short time while the monoethanolamine has only a slight thickening action and is particularly objectionable because it contains ammonia. Ammonia is claimed to cause intergranular or intercrystallar corrosion. It also has an objectionable odor.

It is an object of this invention to prevent the crystallization, the grain formation and the settling out of fluoroborate fluxes whether in the form of a paste or when diluted sufficiently for spraying or dipping.

It is another object of this invention to incorporate in a fluoro-borate flux an odorless material which prevents crystallization, graininess and separation into phases and which leaves no objectionable residue.

Generically these and other objects are obtained by incorporating in any fluoro-borate flux as set forth above containing principally fluoride and borate and alkali radicals between ¼% and 2% by weight, on an anhydrous basis, of carboxypolymethylene.

As another generic example of the invention, ¼% to 2%, preferably ½%, of carboxypolymethylene by weight on an anhydrous basis is added to any of the fluxes set forth in Patent 2,322,416, issued June 22, 1943.

As set forth therein; preferably the formulae for the different types of fluxes should be limited as follows:

| | Anhydrous basis, percent |
|---|---|
| Boric acid | 30 to 60 |
| Alkali fluoride | 20 to 95 |
| Hydrogen fluoride | 2 to 10 |
| Water, quantity sufficient to make | 100 |
| Boric acid | 40 to 80 |
| Alkali carbonate | 40 to 50 |
| Hydrogen fluoride | 2 to 20 |
| Water, quantity sufficient to make | 100 |
| Boric acid | 40 to 80 |
| Alkali hydroxide | 10 to 50 |
| Hydrogen fluoride | 2 to 20 |
| Water, quantity sufficient to make | 100 |

Instead of boric acid some borate may be used, such as potassium borate, which may be mixed in the initial step with hydrofluoric acid to provide the same result as is obtained with boric acid and potassium fluoride. Likewise sodium borate might be used in the initial step with hydrofluoric acid in order to obtain a product containing sodium.

It is not necessary that potassium fluoride be used, or to depend on potassium for the metallic radical in the first step, but sodium, lithium, calcium, magnesium or strontium fluoride, having similar properties, may be used instead of the potassium fluoride. Of this group, potassium, lithium and sodium appear to be superior for most purposes.

As one specific example of the invention, the flux is made up of the following:

120 lbs. (26.6%) anhydrous boric acid
90 lbs. (20%) anhydrous potassium fluoride
27 lbs. (6%) 70% hydrogen fluoride (30% water)
1½ lbs. (.3%) carboxypolymethylene
150 cc. wetting agent
63 lbs. (14%) water The wetting agent, preferably, is one known as Igepal "C" or Triton which is a product having the general formula $C_nH_{2n+1}(-O-C_2H_4-)_x-O-CH_2-CH_2-OH$ in which $n$ is 6 or more and $x$ is 3 or more.

Preferably, the carboxypolymethylene is mixed with the anhydrous boric acid prior to its use in the process as set forth in Patent 2,322,416. However, if desired, the carboxypolymethylene may be sifted in slowly after the other ingredients have been mixed together into the wet mix. Also, the carboxypolymethylene can be stirred into part of the water and added to the mix.

As set forth in said patent, the potassium fluoride should be first dissolved and then the boric acid added slowly. After this, the hydrofluoric acid should be added.

During the soldering, brazing or welding, the carboxypolymethylene burns out with little bursts of flame long before the soldering, brazing or welding temperature is reached. This burning takes place at about 300° to 400° F. The burning of the carboxypolymethylene leaves a clear glass residue with no char in it. The material has a long shelf life and when used for spray or dip coating is homogeneous and will not settle out. It can be diluted to spraying consistency and left in the spraying equipment without use for extended periods without settling out or separating into phases. It thus provides an advantageous flux for hard soldering, brazing or welding by any desired form of application.

What is claimed is as follows:

1. In a fluoro-borate flux consisting essentially of a fluoride and a borate, the improvement consisting of the combination of said flux with carboxypolymethylene in quantities of between ¼% and 2% by weight of the flux on an anhydrous basis.

2. In a fluoro-borate flux consisting essentially of a fluoride and a borate, the improvement consisting of the combination of said flux with carboxypolymethylene in the quantity of about ½% by weight of the flux on an anhydrous basis.

References Cited in the file of this patent

UNITED STATES PATENTS 2,088,935    Vaughn _____ Aug. 3, 1937